Patented Oct. 11, 1927.

1,645,173

UNITED STATES PATENT OFFICE.

ALEXANDER WINOGRADOFF, OF NEW YORK, N. Y., ASSIGNOR TO IMPROVED OFFICE PARTITION CO., OF ELMHURST, LONG ISLAND, NEW YORK, A CORPORATION OF NEW YORK.

LIQUID MIXTURE FOR USE IN TREATING COMBUSTIBLE FIBROUS MATERIALS TO RENDER THEM FIRE RESISTANT.

No Drawing.    Application filed December 22, 1926.    Serial No. 156,516.

The object of my invention is to produce a liquid mixture suitable for use in treating combustible fibrous materials, such, for instance, as wood, to render the same fire resistant, even when the material is exposed to the elements; said liquid mixture being a mixture of a solution of a water soluble magnesium salt, such, for instance, as magnesium sulphate, and a solution of a water soluble bicarbonate, such, for instance, as potassium bicarbonate.

Presupposing magnesium sulphate and potassium bicarbonate are to be used to produce the liquid mixture, the solution of the magnesium sulphate is mixed with the solution of the potassium bicarbonate at normal room temperature (about 20° centigrade) and the resultant mixture will be a water clear liquid which will remain without reaction for a reasonable time so long as it is kept at normal room temperature. When the liquid mixture is to be used in treating combustible fibrous material, such, for instance, as wood, to render it fire resistant, the material is treated with the liquid mixture at substantially its normal temperature. After this treatment the fibrous material is then subjected to heat, thereby releasing carbon dioxide and precipitating magnesium carbonate, which precipitate will render the fibrous material substantially permanently fire resistant even if the material is exposed to the elements, thus rendering the material suitable for outside as well as inside use.

As an example: I prepare a mixture of a 15% solution of magnesium sulphate with a 10% solution of potassium bicarbonate (by dissolving 300 gr. $MgSO_4.7H_2O$ in one litre of cold water and 200 gr. $KHCO_3$ in one litre of cold water and mixing them together at ordinary room temperature). This water clear liquid mixture is then used, while still cold, to treat the combustible fibrous material, such as wood, for example, by impregnating the same under heavy pressure in a closed chamber so that the liquid mixture will be well distributed throughout the material. The impregnated fibrous material may then be subjected to heat (preferably at a temperature of from 30° to 60° centigrade) in a kiln, thereby liberating carbon dioxide and precipitating magnesium carbonate throughout the material being treated, which precipitate renders the treated fibrous material fire resistant even when the material is exposed for considerable periods, to the elements.

Other water soluble magnesium salts which might be used are magnesium chlorate and magnesium nitrate; and other water soluble bicarbonates which might be used are sodium bicarbonate and ammonium bicarbonate.

What I claim is:—

1. A mixture of a solution of a water soluble magnesium salt and a solution of a water soluble bicarbonate for treating combustible fibrous material to render it fire resistant.

2. A mixture of a solution of magnesium sulphate and a solution of a water soluble bicarbonate for treating combustible fibrous material to render it fire resistant.

3. A mixture of a solution of a water soluble magnesium salt and a solution of potassium bicarbonate for treating combustible fibrous material to render it fire resistant.

4. A mixture of a solution of magnesium sulphate and a solution of potassium bicarbonate for treating combustible fibrous material to render it fire resistant.

5. A mixture of a solution of magnesium sulphate and a solution of potassium bicarbonate in substantially the proportions specified for treating combustible fibrous material to render it fire resistant.

6. A mixture of a solution of fifteen percent magnesium sulphate and a solution of ten percent potassium bicarbonate for treating combustible fibrous material to render it fire resistant.

7. A mixture of a solution of fifteen percent magnesium sulphate and a solution of ten percent potassium bicarbonate in substantially the proportions specified for treating combustible fibrous material to render it fire resistant.

8. A mixture of a solution of fifteen percent magnesium sulphate and a solution of ten percent potassium bicarbonate in substantially the proportions of three parts of magnesium sulphate to two parts of potassium bicarbonate for treating combustible fibrous material to render it fire resistant.

In testimony, that I claim the foregoing as my invention, I have signed my name this 9th day of December, 1926.

ALEXANDER WINOGRADOFF.